US009447857B2

(12) United States Patent
Giansetto et al.

(10) Patent No.: US 9,447,857 B2
(45) Date of Patent: Sep. 20, 2016

(54) TORQUE CONVERTER ASSEMBLY FOR A VEHICLE (71) Applicant: DAYCO EUROPE S.r.I., Chieti (IT)

(72) Inventors: Giacomo Giansetto, Frazione Chieti Scalo (IT); Andrea Montani, Torre Vecchia Teatina (IT); Gianluca Cariccia, Oristano (IT); Tommaso Di Giacomo, S. Martino Sulla Marrucina (IT)

(73) Assignee: DAYCO EUROPE S.R.L., Chieti (IT)

( * ) Notice: Subject to any disclaimer, the term of this patent is extended or adjusted under 35 U.S.C. 154(b) by 74 days.

(21) Appl. No.: 14/386,623

(22) PCT Filed: Mar. 21, 2013

(86) PCT No.: PCT/EP2013/056000
§ 371 (c)(1),
(2) Date: Sep. 19, 2014

(87) PCT Pub. No.: WO2013/139944
PCT Pub. Date: Sep. 26, 2013

(65) Prior Publication Data
US 2015/0083538 A1 Mar. 26, 2015

(30) Foreign Application Priority Data
Mar. 21, 2012 (IT) .............. TO2012A0256

(51) Int. Cl.
*F16H 45/02* (2006.01)
*F16H 45/00* (2006.01)
(52) U.S. Cl.
CPC ......... *F16H 45/02* (2013.01); *F16H 2045/002* (2013.01); *F16H 2045/0247* (2013.01)

(58) Field of Classification Search
CPC ............. F16H 45/02; F16H 2045/002; F16H 2045/007; F16H 2045/0221; F16H 2045/0226
See application file for complete search history.

(56) References Cited

U.S. PATENT DOCUMENTS

| 4,105,102 | A | * | 8/1978 | Nels | F16H 45/02 192/210 |
| 4,557,357 | A | * | 12/1985 | Tinholt | F16H 45/02 464/59 |
| 5,234,376 | A | * | 8/1993 | Chimner | F16F 15/16 192/3.29 |
| 2001/0032767 | A1 | * | 10/2001 | Reinhart | F16H 45/02 192/3.29 |
| 2012/0043173 | A1 | * | 2/2012 | Jameson | F16H 45/02 192/3.23 |
| 2012/0210707 | A1 | * | 8/2012 | Maienschein | F16H 45/02 60/338 |

FOREIGN PATENT DOCUMENTS

| DE | 10017743 | 10/2001 |
| DE | 10017801 | 10/2001 |
| JP | 2006292126 | 10/2006 |

OTHER PUBLICATIONS

PCT, International Search Report and Written Opinion, PCT/EP2013/056000 (Mar. 21, 2013).

* cited by examiner

*Primary Examiner* — Jacob S Scott
(74) *Attorney, Agent, or Firm* — Thompson Hine LLP (57) ABSTRACT A torque converter assembly having a hub for connection with an input shaft of a gearbox, a lock-up clutch module for selective connection with a crankshaft of an internal combustion engine, a turbine module of a torque converter rigidly connected to the lock-up clutch module and rotatable with respect to the hub, and a spiral spring isolator to resiliently connect the hub with the lock-up clutch module and the turbine module.

15 Claims, 8 Drawing Sheets

TORQUE CONVERTER ASSEMBLY FOR A VEHICLE

TECHNICAL FIELD

The invention relates to driveline torque converter assembly, in particular providing a torsion isolator operable over the entire operational range of a driveline. More specifically, the invention relates to such assembly for vehicle drivelines.

BACKGROUND ART

It is well-known that the speed of an internal combustion engine output or crankshaft varies even during so-called steady-state operation of the engine, i.e. the shaft continuously accelerates and decelerates about the average speed of the shaft. The accelerations and decelerations are, of course for the most part, a result of power pulses from the engine cylinders. The pulses may be of uniform frequency and amplitude when cylinder charge density, air/fuel ratio, and ignition are uniform. However, such uniformity does not always occur, thereby producing pulses which vary substantially in frequency and amplitude. Whether uniform or not, the pulses, which are herein referred to as torsionals or torque fluctuations, are transmitted through vehicle drivelines and to passengers in vehicles. The torsionals, which manifest themselves as vibrations, are detrimental to drivelines and derogate passenger-ride quality. Further, when an engine is abruptly accelerated and/or decelerated by accelerator pedal movement or other factors, torque pulses ring through the driveline and also derogate ride quality.

A driveline may comprise a torque converter connected to the gearbox and lock-up clutch to selectively disconnect a turbine of the torque converter to the crankshaft. When the lock-up clutch is open, the impeller of the torque converter drives a turbine of the torque converter to generate an input torque for the gearbox that is higher than the torque from the internal combustion engine crankshaft. Furthermore, the drivetrain is assembled from the combination of sub-units or assemblies that are manufactured aside of the assembly line and delivered to the drivetrain manufacturer that assembles together the sub-units.

DISCLOSURE OF INVENTION

The scope of the present invention is to provide an improved torque converter assembly having an efficient torsional isolation function.

The scope of the present invention is achieved with a torque converter assembly according to claim 1.

BRIEF DESCRIPTION OF THE DRAWINGS

For a better understanding of the present invention, the latter will further be disclosed with reference to the accompanying figures in which.

BEST MODE FOR CARRYING OUT THE INVENTION

Figure 1:
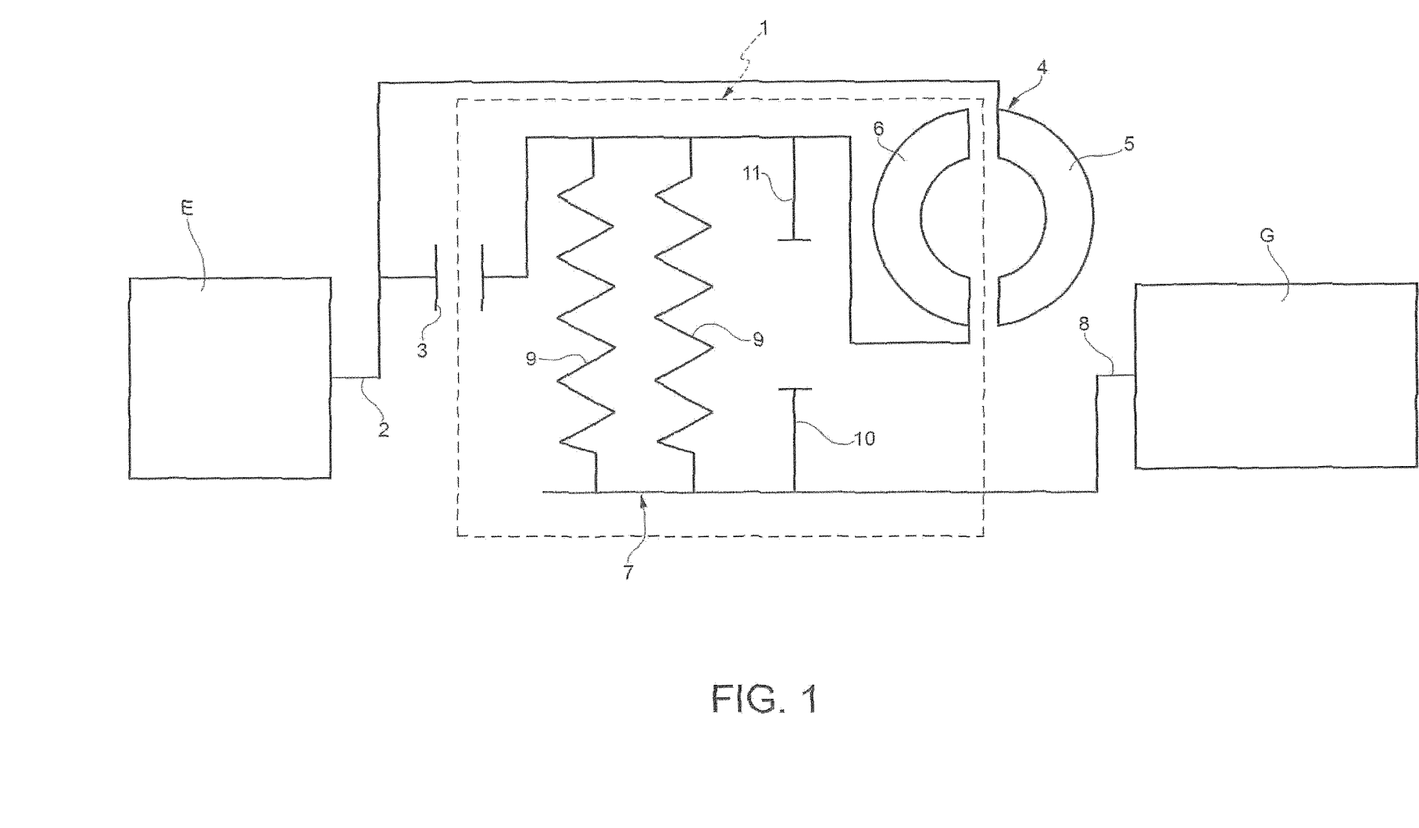
FIG. 1 is a schematic functional sketch of an improved torque converter assembly according to the present invention.

In FIG. 1, numeral 1 refers to a torque converter assembly to connect the crankshaft 2 of internal combustion engine E with the input shaft of a gearbox, preferably a continuously variable transmission comprising a planetary gear of a rear wheel drive vehicle.

Torque converter assembly comprises a portion of a lock-up clutch 3, a portion of a torque converter 4 having an impeller 5 and a turbine 6, and an isolator or decoupler 7. Lock-up clutch 3 is provided to selectively connect turbine 6 and crankshaft 2 and the impeller 5 is rigidly connected to the crankshaft. Isolator 7 is provided to resiliently transfer torque load from turbine 6 to input shaft 8 of gearbox G. A drivetrain of a vehicle comprises at least lock-up clutch 3, torque converter 4, isolator, gearbox G and a differential (not shown).

Preferably, isolator 7 comprises at least one or more spiral springs 9 arranged in parallel between turbine 6 and input shaft 8 and stops 10, 11 to prevent overload on spiral springs 9 when transferred torque exceeds a predefined level. In particular, lock-up clutch 3 is such that, in a closed position, turbine 6 and crankshaft 2 are rigidly connected and that, in an open position, turbine 6 is driven by fluid provided by impeller 5 to drive input shaft 8 with a torque that is different, and in particular higher, than the torque of crankshaft 2.

Furthermore, stops 10, 11 are provided to avoid that an excessive torque be applied to isolator 7 in particular when lock-up clutch 3 is open. When lock-up clutch is closed, impeller 5 and turbine 6 are an inertia mass rigidly connected to crankshaft 2 and isolator 7 decouples torque fluctuations of inertia masses from input shaft 8.

As a preferred embodiment of the present invention, isolator 7 comprises a spiral spring 9 having a number of volutes or convolutions defined by an angle comprised between 250° and 600° and a maximum height/width ratio of the cross section comprised between 0.4 and 0.8. In the present description and claims, a spiral spring comprises spires or portions of spires having a variable curvature and, therefore, a variable radius. Such variation may be either continuous or discontinuous. As an example, at least a portion of each spiral spring 9 may be shaped as an Archimedes' spiral. Furthermore, the spires provide a radial gap to avoid direct contact. Alternatively, there might be two or more spiral springs arranged with an axial offset among each other.

Figure 4:
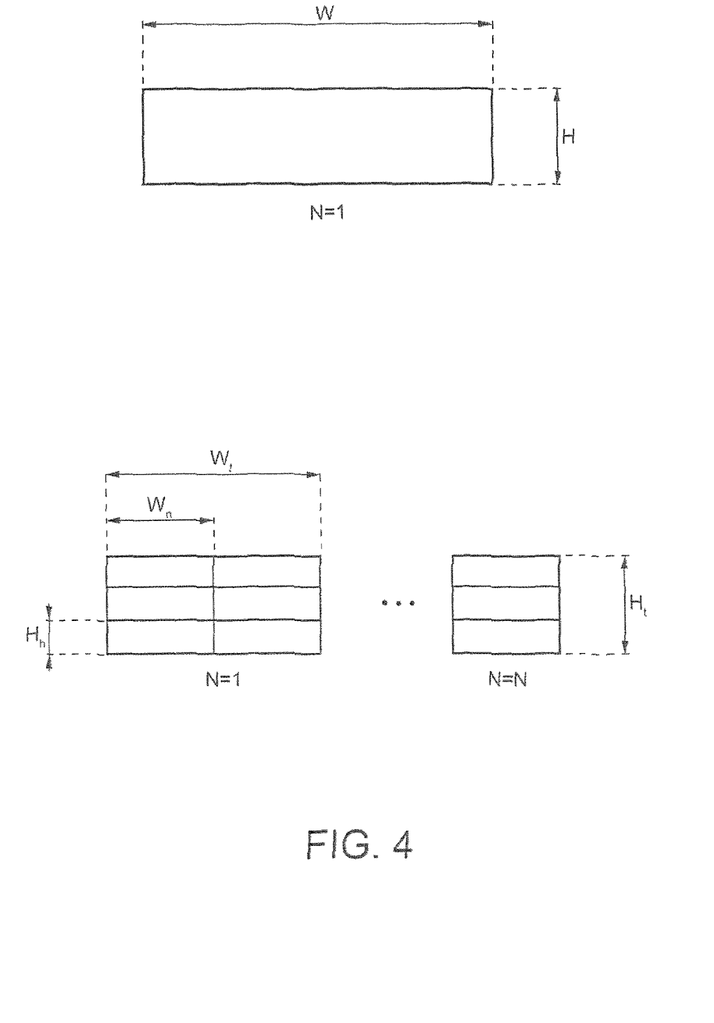
FIG. 4 is a scheme of a cross section of a spiral spring of the assembly according to the present invention.

In a preferred embodiment, the cross section of each spiral spring 9 has a maximum width comprised between 10 mm and 30 mm and a maximum height comprised between 4 mm and 12 mm. Preferably, each spiral spring is made of a flat metal wire spring. In particular, it is also possible that a number of spiral springs having a flat faced cross section are connected in parallel and have overall maximum values of the cross section comprised within the above ranges. In this case, the cross section of the spiral springs is either the same or each spring may have its own cross section. In particular, as shown in FIG. 4, overall maximum width Wt is:

$$Wt = \sum_{n=1}^{N} (W_n)$$

i.e. the sum of the widths of the cross sections of the metal springs.

It is also possible that overall maximum height Ht be the sum of:

$$Ht = \sum_{n=1}^{N} (H_n)$$

i.e. the sum of the heights at the cross sections of the metal springs.

It has proven to be of a certain relevance to improve the performance over fatigue life that the fillet to connect planar faces of each spiral spring 9 be comprised between 1 mm and 3 mm. Preferably, the cross section of each spiral spring is substantially rectangular. The above features serve alone and, better, in combination to obtain the desired range of stiffness or spring rate to decouple the torsional vibrations coming from the crankshaft 2 and, at the same time, achieve the desired fatigue life. Furthermore, the above geometrical ranges help alone or better in combination to obtain a spring having volutes, i.e. V1 and V2, not contacting each other during functioning. Furthermore, the spring is ready-to-manufacture and has therefore a positive impact on manufacturing costs of the assembly.

Figure 2:
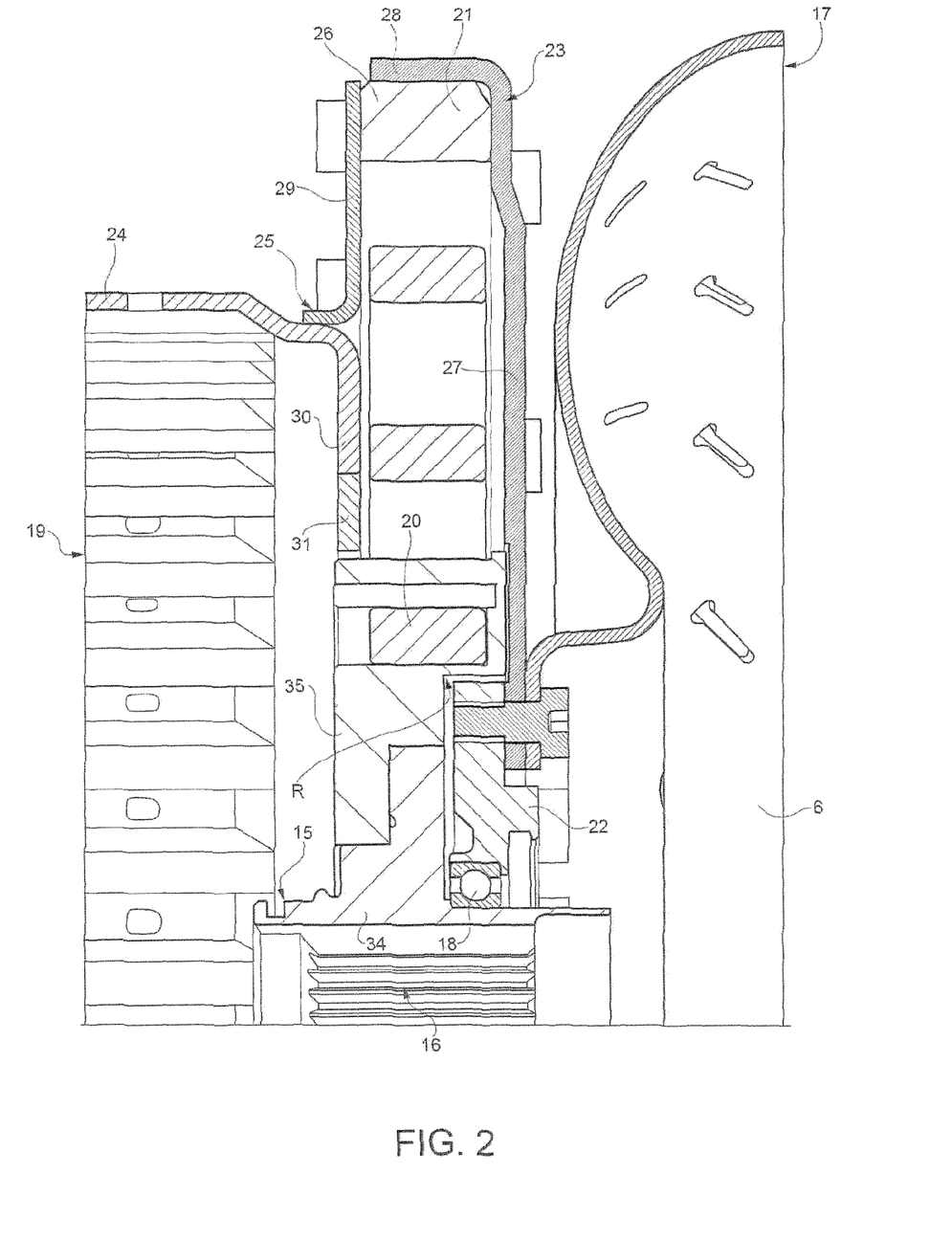
FIG. 2 is a radial cross section of a torque converter assembly according to the present invention.

FIG. 2 describes a preferred embodiment of the present invention. Torque converter assembly 1 comprises, in particular, a hub 15 having a splined hole 16 for connection with input shaft 8, a turbine module 17 functionally correspondent to turbine 6 radially supported on hub 15 via a radial supporting member 18, in particular a bearing, a lock-up clutch module 19 rigidly connected to turbine module 17 and isolator 7 to resiliently connect lock-up clutch module 19 and turbine module 17 with hub 15. Isolator 7 comprises an end portion 20 rigidly connected directly or indirectly to hub 15 and a radially peripheral end portion 21 rigidly connected directly or indirectly to modules 17 and 19. Preferably, isolator 7 comprises a pair of axis-symmetrical spiral springs 9 connected in parallel and wound in the same winding direction. Furthermore, end portions 20, 21 are rigidly connected to hub 15 or modules 17, 19 respectively with a shape coupling or a friction coupling.

Preferably, turbine module 17 comprises a ring 22 supported by bearing 18, turbine 6 and a shaped wall 23. In particular, ring 22 is radially housed in a recess R of hub 15 for the benefit of the axial dimension of assembly 1 that is particularly compact. Furthermore, lock-up clutch module 19 comprises a ring 24 selectively coupled to a further ring (not shown) to define lock-up clutch 3 and a shaped wall 25 rigidly connected to radially peripheral end portion 21. As a non limiting embodiment, ring 24 supports friction discs (not shown) for a selective coupling with a corresponding ring (not shown) fixed to crankshaft 2. Lock-up clutch 3 is therefore a disk clutch having an actuator to switch from the closed to the open position and vice-versa. Axial position of ring 24 is fixed with respect to hub 15 and the disks are axially moved by the actuator. Preferably, shaped wall 23 and shaped wall 25 define with hub 15 an open annular chamber 26 housing spiral springs of isolator 7 and providing passages for hydraulic fluid so that, after assembly of the drivetrain, torque converter assembly 1 is housed within a sealed volume filled with hydraulic fluid. Shaped walls 23, 25 may be manufactured as respective single bodies or as a combination of separate components or a combination of the two. In the present embodiment shaped wall 23 is a single body comprising a lateral wall 27 disposed between isolator 7 and turbine 6 and a cylindrical head wall 28 surrounding peripheral end portion 21. Furthermore, shaped wall 25 comprises an annular wall 29 fixed to peripheral end portion 21, a flange 30 of ring 24 surrounded by annular wall 29 and converging towards hub 15, and a shaped ring 31 surrounded by flange 30. Preferably, at least one of end portions 20, 21 are rigidly connected by a shape coupling or a friction coupling or a combination of the two. In a shape coupling a male portion is centered to avoid substantial play and rigidly coupled to a mating female portion. In a friction coupling, a relevant compression is applied to the end portion of the spring so as to generate high friction and rigidly constrain the end portion of the spring.

Figure 3:
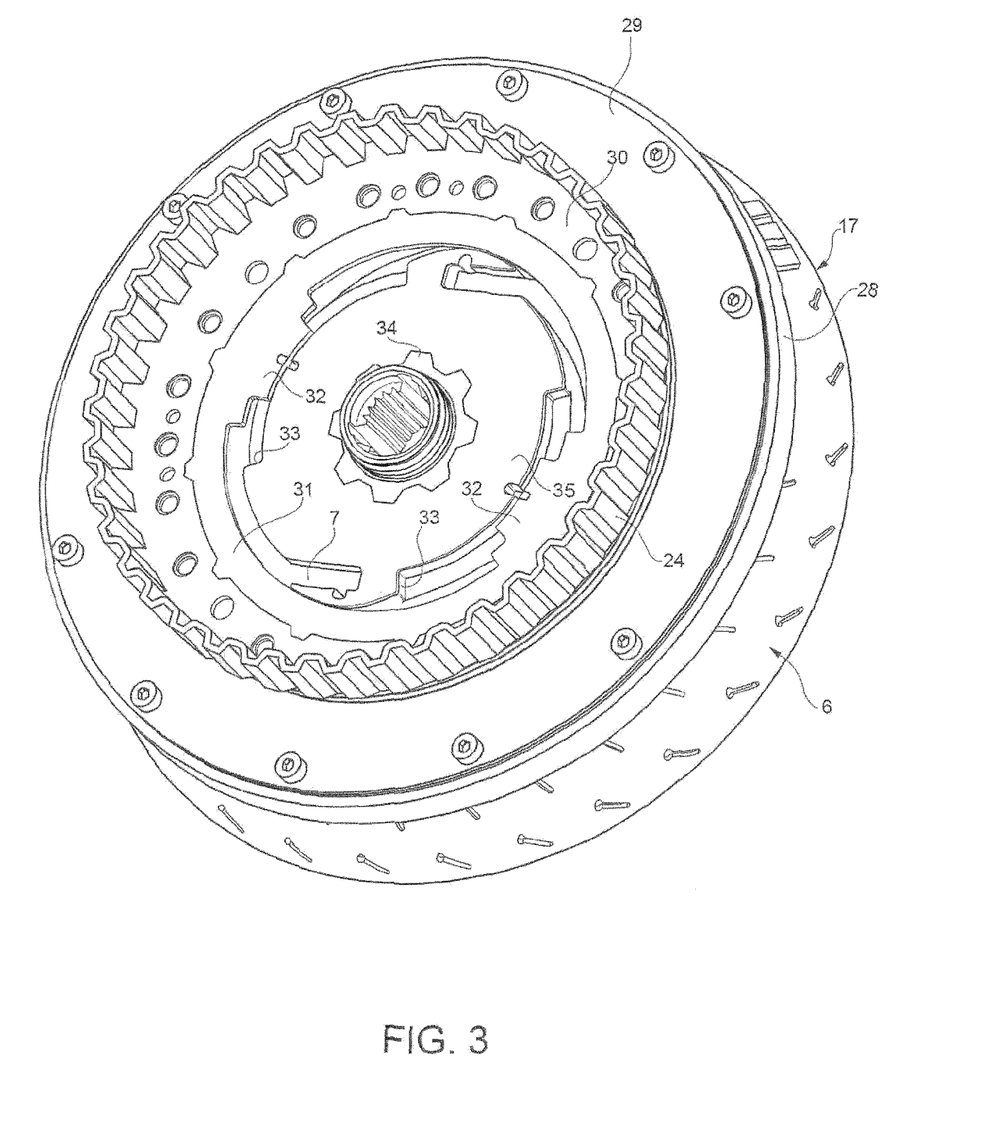
FIG. 3 is a perspective view of FIG. 2.

Preferably, shaped plate ring 31 comprises, as shown in FIG. 3, projections 32 that selectively abut on respective stops 33 of hub 15. Projections 32 and stops 33 abut to define the maximum load on isolator 7 for both directions of rotation and are therefore functionally equivalent to stops 10, 11. Preferably, stops 33 are defined by respective recesses of hub 15. In use, when torque exceeds a predefined level given by projections 32 abutting on stops 33, torque is directly transferred from lock-up clutch module 19 to turbine module 17 and the isolator 7 is loaded at a maximum torque value. Furthermore, As a further preferred embodiment, hub 15 comprises a first body 34 defining hole 16 and an annular body 35 holding spiral springs of isolator 7 and shape coupled, e.g. splined, to body 34. Preferably annular body 35 and spiral springs of isolator 7 are coupled in a shape and force transmitting manner.

The present invention provides the following advantages.

With reference to a rear wheel drive vehicle driveline, input shaft 8 may be relatively long so as to provide a torsional spring rate that is combined with the one of isolator 7. Isolator 7 decouples input shaft 8 from inertia mass comprising turbine module 17 and lock-up clutch module 19. This helps to avoid heavy torsional vibrations associated with a resonance occurring in case a gyratory inertia mass, i.e. lock-up clutch module 19 and turbine module 17 were rigidly connected to a torsionally resilient element such as input shaft 8. Furthermore, spiral spring isolator 7 filters torsional fluctuations of crankshaft 2 and decreases the level of such fluctuations transmitted to input shaft 8. At the same time, spiral spring isolator 7 can be designed to fully transfer the torque of internal combustion engine E to input shaft 8. Therefore, the particular position of isolator 7 within a driveline having a torque converter and a lock-up clutch helps to improve the overall dynamic performances of the driveline itself.

Furthermore, it is possible to achieve positive results in compact axial dimensions and a limited number of components.

Finally it is clear that modifications and variants may be made to the pulley assembly disclosed and shown herein without departing from the scope of protection defined by the appended claims.

In particular, lock-up clutch module 19 shall be intended as a portion of lock-up clutch, i.e. an axially fixed portion as the other components of the lock-up clutch are either attached to another sub-unit or mounted on the assembly line. Accordingly, turbine module 17 is a functional portion of the torque converter which shall be activated by impeller 5 that is not described in further detail in the present application because such component is assembled as a separate sub-unit of the drivetrain comprising e.g. the other lock-up module. Turbine 6 may be provided with or without (as shown in FIG. 2) vanes or fins.

In view of the above, the torque converter assembly shall be intended as an assembled sub-unit of the drivetrain and provided in the conditions to be assembled on an assembly line of the drivetrain. Such sub-unit can be outsourced and therefore be provided by a supplier of the manufacturer of the drivetrain.

Angular stops 10, 11, 32, 33 can be resilient to provide a limited angular displacement between modules 17, 19 and hub 15 after abutment. In such case, the value of torque acting on isolator 7 increases as well when stops 10, 11, 32, 33 are abutting. When stops are rigid or hard, the torque is transferred in a rigid way and the torque acting on isolator 7 is constant and maximum when stops 10, 11, 32, 33 are abutting.

Hub 15 may also be formed by a single body defining also stops 33 and/or holding end portion 20.

According to the present description and claims, the turbine module 17 refers to any arrangement or structure intended for the rigid connection of the lock-up clutch module 19 to the turbine blades of a turbine in a torque converter.

Figure 5:
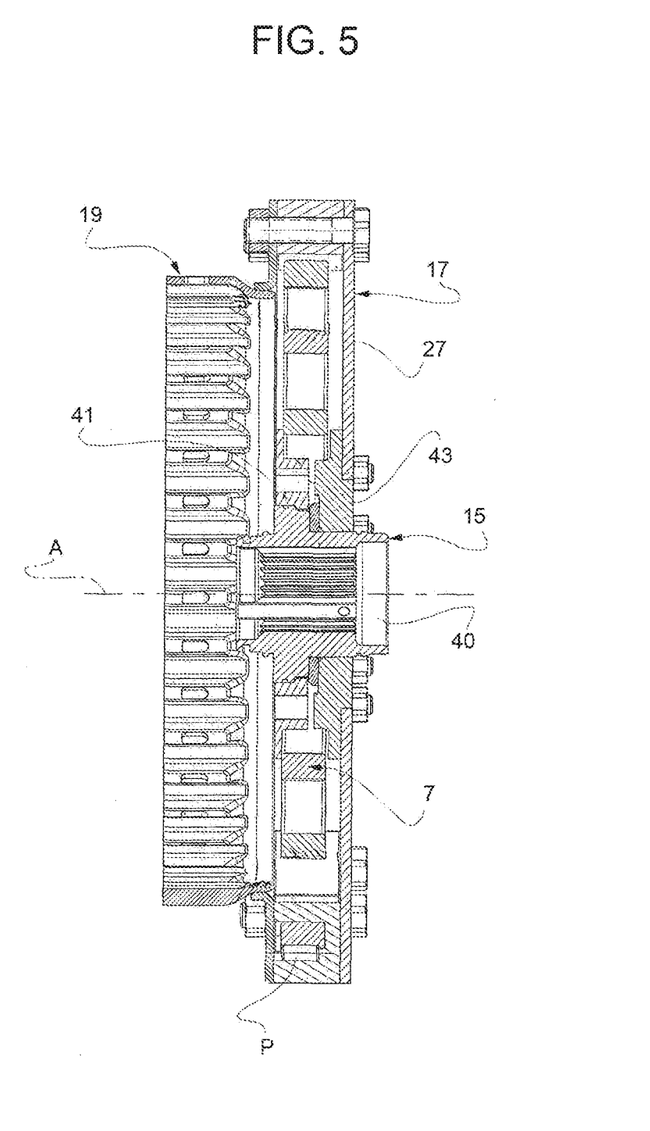
FIG. 5 is a cross section of a further embodiment of the present invention wherein some elements are not shown for clarity.
Figure 6:
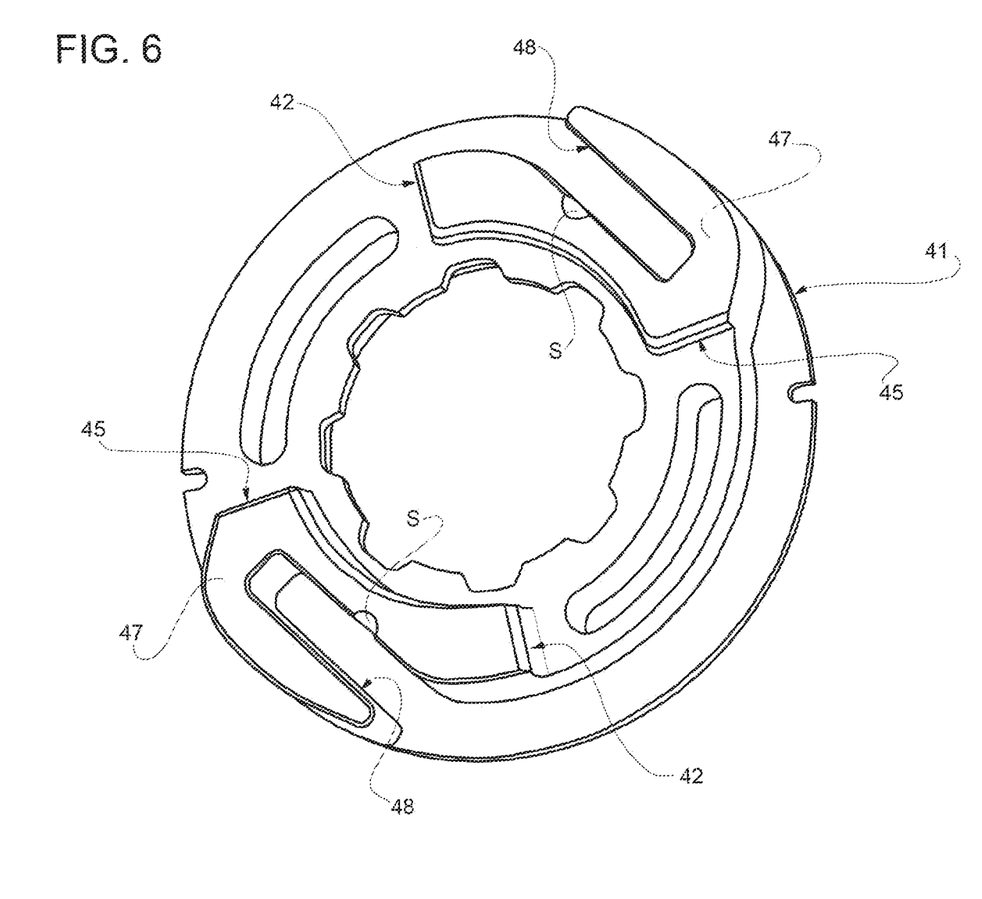
FIGS. 6 and 7 are respective perspective views of elements of FIG. 5.
Figure 7:
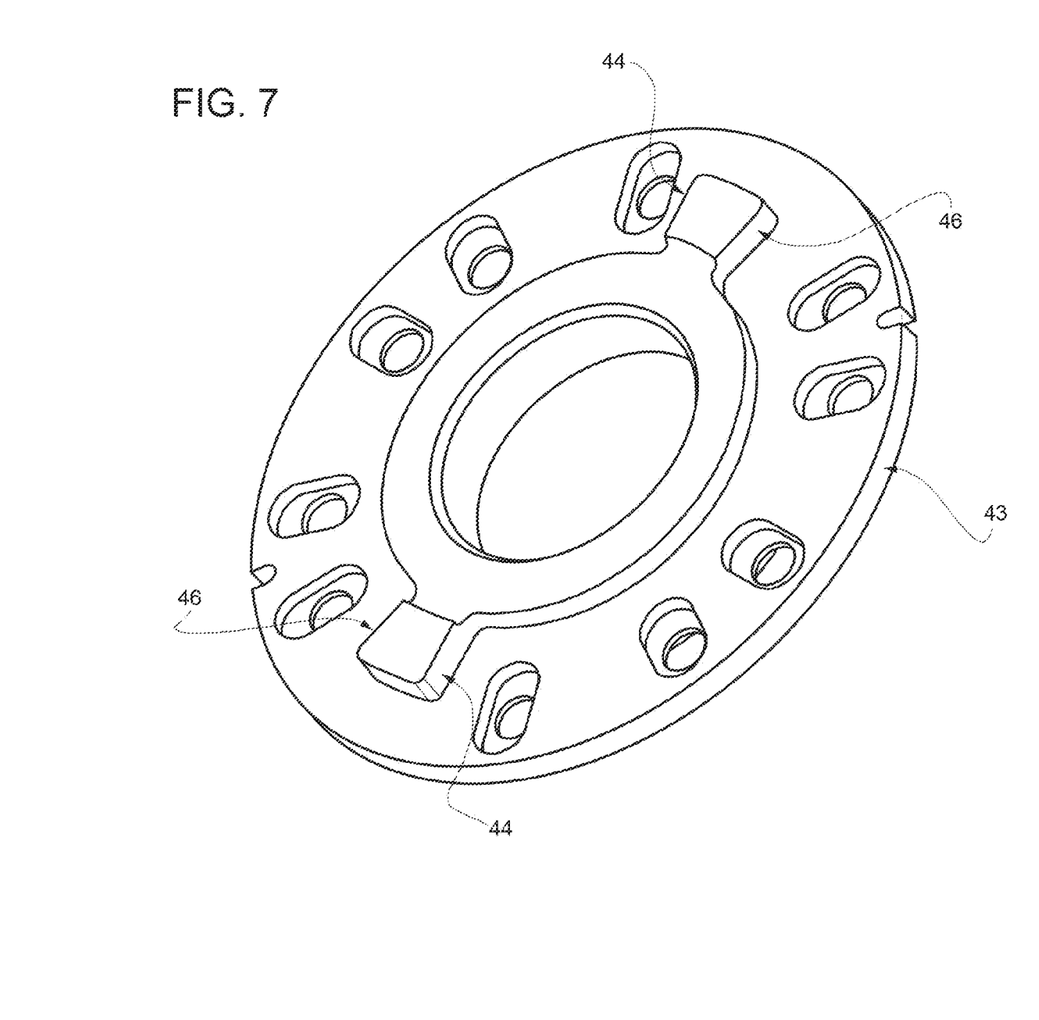
Figure 8:
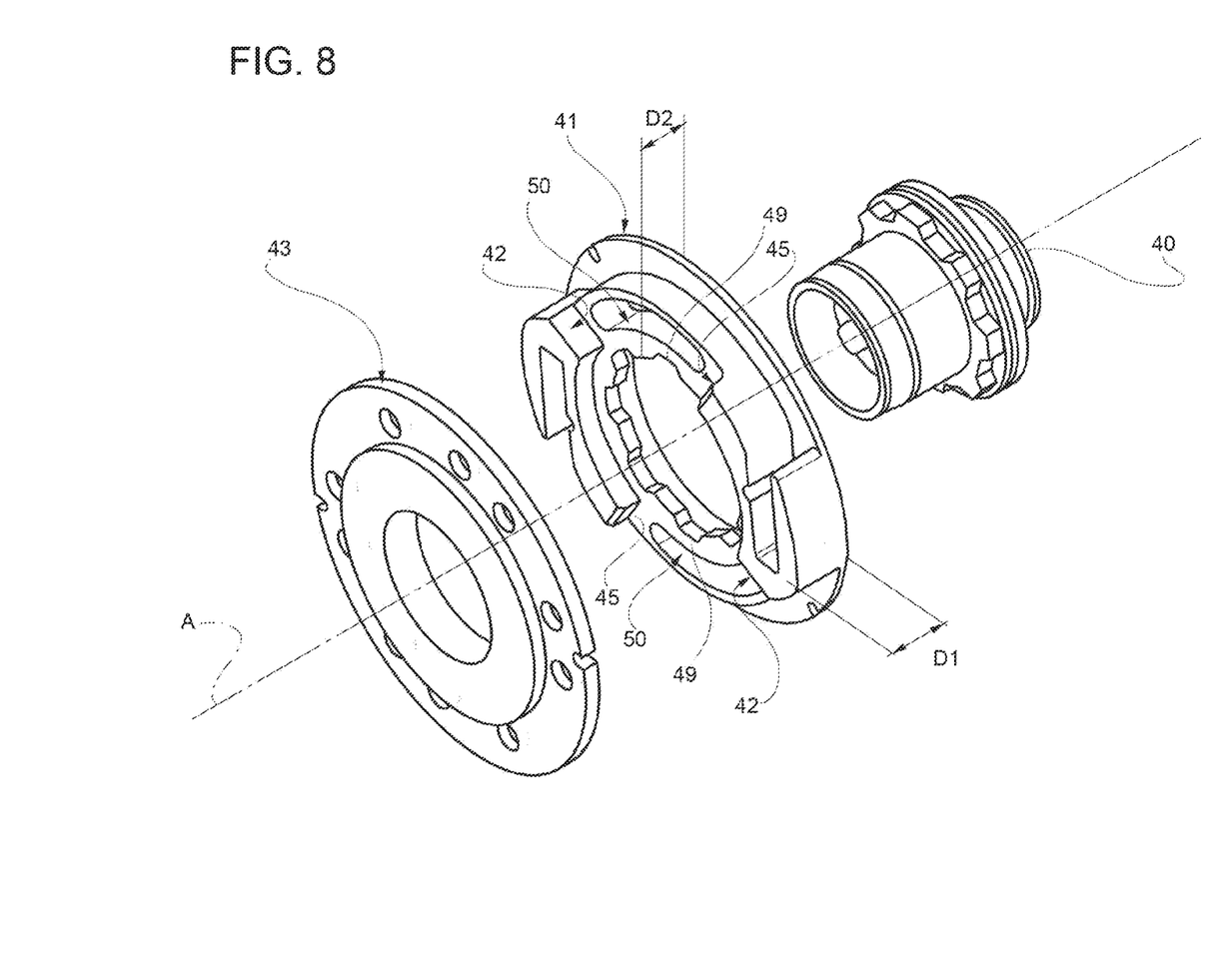
FIG. 8 is an exploded view of a group of features comprising elements of FIGS. 6 and 7.

According to the embodiment of FIG. 5, wherein elements corresponding to the embodiment of FIGS. 2-3 maintain the same reference numbers cited above, hub 15 comprises a main body 40 connectable to input shaft 8 and an annular element 41 having an axis A and rigidly coupled at least to rotation to main body 40 e.g. by a splined connection (FIG. 6). Annular element 41 defines at least one abutment 42, preferably two axis-symmetrical abutments extending axially towards turbine module 17. Such abutment is functionally equivalent to stop 10. Accordingly, turbine module 17 comprises a further annular element 43 rigidly connected to lateral wall 27 e.g. by bolts and rotatable with respect to hub 15. Annular element 43 of turbine module 17 defines an abutting surface 44, preferably two axis-symmetrical abutting surfaces, functionally equivalent to stop 11. Abutments 42 and abutting surfaces 44 extend along the axial direction so as to be circumferentially surrounded by isolator spiral spring 7. This improves compactness along the axial direction. Abutments 42 and abutting surfaces 44 define the maximum relative angular displacement between hub 15 and the combination of lock-up clutch module 19 and turbine module 17 in a first direction of rotation. Correspondingly, annular elements 41 and 43 define respective further abutments 45 and abutting surfaces 46 to define the maximum relative angular displacement between hub 15 and the combination of lock-up clutch module 19 and turbine module 17 in a second direction of rotation.

Annular element 41 further comprises at least a connecting portion 47, preferably two axis-symmetrical connecting portions, having a slot 48 to house in a force transmitting manner end portion 20 of isolator spiral spring 7. Slot 28 further defines a seat S to house an axial pin (an equivalent axial pin P is shown in FIG. 5) for securing end portion 20 to annular element 41.

Axial dimension D1 of connection portion 47 is higher than axial dimension D2 of a portion 49 of annular element 41 facing abutting surfaces 44, 46 of annular element 43. Preferably, each axis-symmetrical portion 49 defines a relative cut out 50, e.g. a through slot, angularly spaced from abutments 42, 45. Cut out 50 decreases the cross section loaded by impact forces generated by the interaction of abutments 42, 45 and abutting surfaces 44, 46. The increased compliance of portions 49 due to cut outs helps to transform impact energy into elastic deformation and to avoid excessive load concentration within abutments 42, 45 so as to increase working life of the torque converter.

The invention claimed is:

1. A torque converter assembly comprising:
 a hub (15) for connection with an input shaft (8) of a gearbox (G),
 a lock-up clutch module (19) for selective connection with a crankshaft (2) of an internal combustion engine (E),
 a turbine module (17) of a torque converter (4) rigidly connected to said lock-up clutch module (19) and rotatable with respect to said hub (15), and
 a spiral spring isolator (7) resiliently connecting said hub (15) with said lock-up clutch module (19) and turbine module (17);
 wherein said torque converter assembly comprises an annular supporting member (22) secured to said turbine module (17) and housed in an annular axial recess (R) of said hub (15) for radially supporting said turbine module (17) on said hub (15), and a shaped wall (23) rigidly connecting said annular supporting member (22) to an outer radial end portion (21) of said spiral spring isolator (7).

2. A torque converter assembly comprising:
 a hub (15) for connection with an input shaft (8) of a gearbox (G),
 a lock-up clutch module (19) for selective connection with a crankshaft (2) of an internal combustion engine (E),
 a turbine module (17) of a torque converter (4) rigidly connected to said lock-up clutch module (19) and rotatable with respect to said hub (15),
 a spiral spring isolator (7) to resiliently connect said hub (15) with said lock-up clutch module (19) and turbine module (17); and
 a first and a second angular stop (10, 11; 32, 33) between said hub (15) and one of said lock-up clutch module (19) and turbine module (17) to transfer torque between said turbine module (17) and said hub (15) above a predefined torque level.

3. The torque converter assembly according to claim 2, wherein said first and second angular stop (10, 11; 32, 33) are arranged so that torque is directly transferred from said lock-up clutch module (17) to said turbine module (19) and said spiral spring isolator (7) is loaded at a maximum torque value defined when said first and second angular stop (10, 11; 32, 33) abut.

4. The torque converter assembly according to claim 2, wherein said first and second stop (10, 11; 32, 33) are either resilient or rigid.

5. The torque converter assembly according to claim 2, wherein said first and second stop (10, 11; 32, 33) are surrounded by said spring isolator (7).

6. The torque converter assembly according to claim 3, wherein said hub (15) comprises a first body (34; 40) and an annular body (35; 41) fixed to an end portion (20) of said spiral spring isolator (7) and having an axis (A).

7. The torque converter assembly according to claim 6, wherein one of said first and second stop (42) axially projects from said annular body (41) towards said turbine module (17).

8. The torque converter assembly according to claim 6, wherein said annular body (41) comprises a first portion (47) having a first axial dimension and a second portion (49) having a second axial dimension lower than said first dimension, one of said first and second stop (42) being defined by an abutment between said first and second portion and said first portion (47) being connected in a force transmitting manner to said spiral spring isolator (7).

9. The torque converter assembly according to claim 8, wherein said second portion (49) defines a cut-out (50), said cut-out (50) being angularly displaced from said abutment (42).

10. The torque converter assembly according to claim 6, having a spline for connection with said input shaft (8).

11. The torque converter assembly according to claim 6, comprising a ring (31) having at least a projection (32) defining one of said first and second angular stop.

12. The torque converter assembly according to claim 11, wherein said ring (31) is on the same side of said lock-up clutch module (17) with respect to said spiral spring isolator (7).

13. The torque converter assembly according to claim 2, wherein said spiral spring isolator (7) has volutes defining an angle comprised between 270° and 600°.

14. The torque converter assembly according to claim 2, wherein said spiral spring isolator (7) comprises a spiral spring having a cross section overall height/width ratio comprised between 0.4 and 0.8.

15. The torque converter assembly according to claim 2, wherein said spiral spring isolator (7) comprises a spiral spring having flat faces and fillet radius between the flat faces comprised between 1 mm and 3 mm.

* * * * *